United States Patent [19]

Katagi

[11] 4,106,021
[45] Aug. 8, 1978

[54] POLAR TO RECTANGULAR COORDINATE CONVERTER

[75] Inventor: Kazuo Katagi, Woodland Hills, Calif.

[73] Assignee: RCA Corporation, New York, N.Y.

[21] Appl. No.: 812,363

[22] Filed: Jul. 1, 1977

[51] Int. Cl.² ............................ G01S 7/44; G01S 9/60
[52] U.S. Cl. ................................. 343/5 SC; 343/5 W
[58] Field of Search ............................ 343/5 SC, 5 W

[56] References Cited

U.S. PATENT DOCUMENTS

| 3,765,018 | 10/1973 | Heard et al. | 343/5 SC |
| 3,810,174 | 5/1974 | Heard et al. | 343/5 SC X |
| 4,002,827 | 1/1977 | Nevin et al. | 343/5 SC |

FOREIGN PATENT DOCUMENTS 2,344,506  4/1974  Fed. Rep. of Germany ........ 343/5 SC

*Primary Examiner*—T.H. Tubbesing
*Attorney, Agent, or Firm*—H. Christoffersen; Joseph D. Lazar; Raymond E. Smiley

[57] ABSTRACT

A memory for a coordinate converter stores, for each azimuth at which information from an information source may be received in a polar coordinate system, the incremental X and Y coordinate values, ΔX and ΔY, for an incremental change in range along the azimuth. For each azimuth these incremental coordinate values ΔX and ΔY are retrieved from memory and entered into summing devices which are incremented respectively by ΔX and ΔY for each increment of range. The integers of the values of the summing devices represent X and Y coordinate values in a rectangular coordinate system and may be utilized to address an information reception device such as a random access memory.

10 Claims, 4 Drawing Figures

POLAR TO RECTANGULAR COORDINATE CONVERTER

BACKGROUND OF THE INVENTION

A number of prior art systems are known for creating rectangular (X and Y) coordinates for information received in polar (azimuth and range) coordinate form. In one such converter the information is written onto a storage type cathode ray tube in polar format. Associated with the storage tube is an image orthocon tube which is typically scanned in raster scan format to provide essentially a rectangular coordinate format. Such converters are expensive, bulky and not readily compatible with modern solid state systems.

U.S. Pat. No. 3,765,018 issued Oct. 9, 1973 to J. L. Heard et al., for example, describes an approach which may make use of the digital logic. In that patent a signal indicative of azimuth position is utilized to address read only memories which produce digital signals indicative of the sine and cosine of the particular azimuth. At each range position along the azimuth the value of the range is multiplied by the sine and cosine values to produce X and Y addresses in a digital memory at which the information at the particular azimuth and range is stored. Such a converter is capable of computing X and Y addresses relatively quickly but requires two relatively costly multiplier circuits.

SUMMARY OF THE INVENTION

In accordance with the invention, a polar to rectangular coordinate converter includes means producing fractional trigonometric sine and cosine values corresponding to any desired azimuth, first and second storage means, first and second summing means receptive respectively of the sine and cosine values and respectively the values in said first and second storage means and first and second counting means coupled to the first and second summing means respectively. One summing means sums the value of one of the trigonometric sine and cosine values with the value in its associated storage means, stores the result in the storage means and produces a pulse indicative of the integer part, if any, of the sum. This operation is repeated a number of times corresponding to the number of ranges of interest for the desired azimuth. The integer indicative pulse, if any, of each summing operation is utilized to advance the associated counting means. The count in the counting means corresponds to the row address in the rectangular coordinate system. The remaining summing means, storage means and counting means are responsive to the other of the sine and cosine values and operate in the same manner as that of the first summing means to produce column address values.

DETAILED DESCRIPTION

Figure 1:
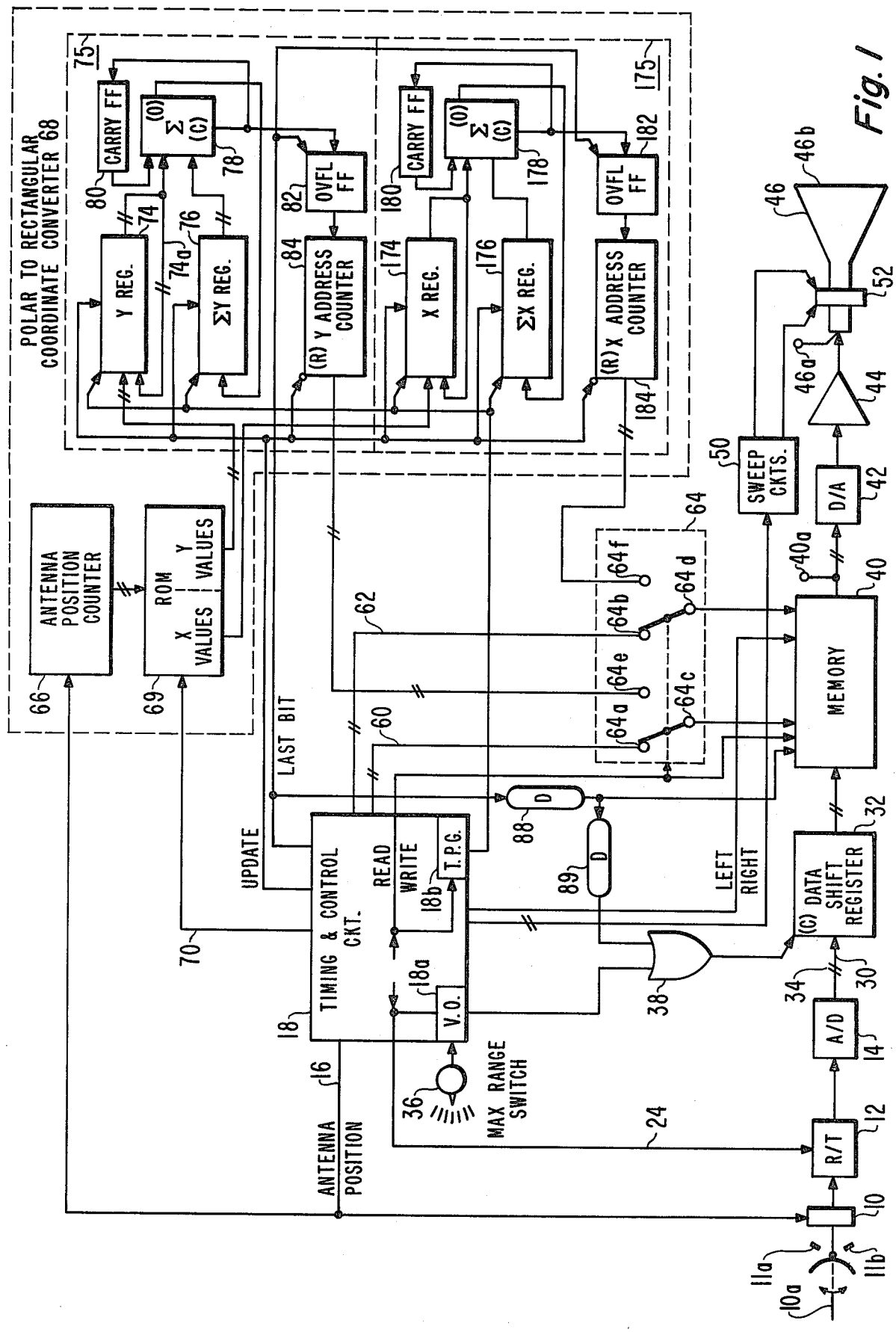
FIG. 1 is a weather radar system including a preferred embodiment of the present invention.

In FIG. 1 a pivotable weather radar antenna 10 is coupled to a receiver/transmitter (RT) 12 which in turn is coupled to an analog to digital converter (AD) 14. The antenna, receiver/transmitter and analog to digital converter are all of standard design found in typical airborne weather radar units such as for example, the PriMUS 40 weather radar manufactured and sold by the RCA Corporation, Van Nuys, California. Antenna position line 16 from a master timing and control circuit (TC) 18 is coupled to antenna 10 to advance the antenna to succeeding angular positions.

TC 18 is also coupled via line 24 to the control terminal of RT 12 for purposes of controlling the timing of radar pulses emitted via antenna 10 to the atmosphere. Each pulse on line 16 from TC 18 causes antenna 10 to pivot to a successive angular or azimuth position. Return signals received at antenna 10 as a result of a pulse transmitted by the antenna 10 are shaped and amplified by RT 12 as is well known to those skilled in the radar art. The return signals at RT 12 as a function of time represent atmospheric conditions at increasing distances from the antenna. AD 14 receives return radar signals from RT 12 and continuously converts the signals to digital signals. For example, in one exemplary embodiment, two bit signals are generated which would allow differentiation of four distinctive states ranging from representation of a clear sky (which may be represented by the decimal value 0) to a representation of a dense storm cloud (which may be represented by the decimal value 3).

AD 14 is coupled via a multiconductor cable 30 to a temporary storage means or buffer such as shift register 32. (Note that all multiconductor cables are designated as such by cross hatched lines such as 34.) Included in TC 18 is a variable oscillator (VO) 18a the frequency of which is controlled by an operator-set Maximum Range Switch 36. Oscillator 18a is coupled via OR gate 38 to the control (C) terminal of shift register 32. The arrangement of VO 18a and switch 36 is such that, for a given setting of switch 36 which is indicative of a given maximum distance of interest to the radar operator, VO 18a produces a given number of uniformly spaced pulses during the time required for radar returns to antenna 10 from the maximum distance of interest. That is, the number of uniformly spaced pulses is independent of the setting of Maximum Range Switch 36 while the frequency of the pulses is dependent on the setting. These uniformly spaced pulses are applied to the C terminal of shift register 32 causing it to accept digitized data from AD 14. Although not illustrated, TC 18 is provided with suitable circuitry which causes VO 18a to produce a given number of pulses after a pulse has been produced on line 24 and then to stop producing signals until the next pulse appears on line 24. Assume, for example, a shift register 32 having a capacity for twelve information or data cells and, therefore, a VO 18a adapted to produce twelve pulses. Assume further a maximum range setting on switch 36 of 60 nautical miles. Therefore, at a given angle or azimuth, after twelve pulses have been produced by VO 18a, shift register 32 contains twelve information cells representing atmospheric conditions at successive five nautical mile increments (60 nautical miles divided by 12 pulses = 5 nautical miles/pulse).

Shift register 32 is coupled to a storage means such as memory 40, for storing at selected locations therein, data contained in shift register 32. Memory 40 is connected to a digital to analog converter (DA) 42 which converts digital signals stored in memory 40 into equivalent analog signals. DA 42 is coupled to amplifier 44 which in turn is coupled to the video or intensity modulation terminal 46a of a display means such as a CRT 46 for intensity modulating different portions of a display screen 46b thereof.

The time dependent location of the intensity modulation on display screen 46b is determined by signals from sweep circuits 50 applied to X and Y (horizontal and vertical) deflection means 52 which are coupled to CRT 46. The sweep circuits in turn are under the control of TC 18. The sweep circuits 50, deflection means 52 and CRT 46 are all of conventional design such as the type found in a conventional television set. In one preferred embodiment of the invention the deflection means 52 are arranged such that each scan line extends from the bottom of the screen to the top of the screen rather than from the left of the screen to the right of the screen and that successive scan lines appear to the right of preceding scan lines. The sweep circuit may be conditioned to cause a raster scan format either interlaced or not as desired on display screen 46b.

Output lines 60 and 62 of TC 18 are coupled to terminals 64a and 64b of a multiplex circuit 64 illustrated schematically for convenience as a double pole, double throw switch. The common terminals 64c and 64d of multiplexer 64 are coupled, respectively, to the Y and X address lines of memory 40. A read/write line from TC 18 is coupled to multiplexer 64 to control the position of poles 64c and 64d and is coupled to memory 40 to condition it for reading or writing. Read/write line is also coupled to timing pulse generator (TPG) 18b to control its operation as will be described more fully hereinafter. Thus when reading from memory 40 is occurring, poles 64c and 64d are positioned as shown in FIG. 1 such that TC 18 determines the position in memory from which data is being read and controls sweep circuits 50 to cause deflection of electron beam in CRT 46 in accordance with the location on display screen 46b that data from memory 40 is to appear. An additional line is also coupled between TC 18 and memory 40 to determine whether the left half of memory corresponding to the left half of screen 46b or the right half of memory corresponding to the right half of display screen 46b is being read from.

Line 16 from TC 18, in addition to advancing antenna 10, also controls an antenna position counter 66 which is one component of a polar to rectangular coordinate converter 68. Counter 66 advances or decreases by one for each pivotable step of antenna 10 depending upon whether antenna 10 is moving away from its central angular position 10a or toward the central angular position. Thus the count in counter 66 continuously corresponds to the angular position of antenna 10 relative to its center line so long as the antenna is stepping properly upon command. If antenna 10 becomes out of synchronization with counter 66, such as may occur upon startup, repeated antenna position pulses will eventually drive antenna 10 against one end stop (11a or 11b) where it will remain until counter 66 reaches a count corresponding to that end stop position. At that time counter 66 and antenna 10 will be in synchronism. If the antenna becomes stuck (i.e., fails to advance upon command) counter 66 will still increment or decrement upon receipt of each position antenna signal on line 16.

The effect that the stuck antenna has on the system of FIG. 1 will be discussed hereafter.

Counter 66 is coupled to a memory means such as ROM 69 for purposes of addressing the ROM while a line 70 passes signals from TC 18 to ROM 69 for controlling read out thereof. ROM 69 contains for each possible angular position of antenna 10, cosine and sine values of the angle of the antenna scaled to reflect the relationship between the amount of storage capacity (number of data cells) in shift register 32 and the number of rows and columns of storage in memory 40.

Figure 2:
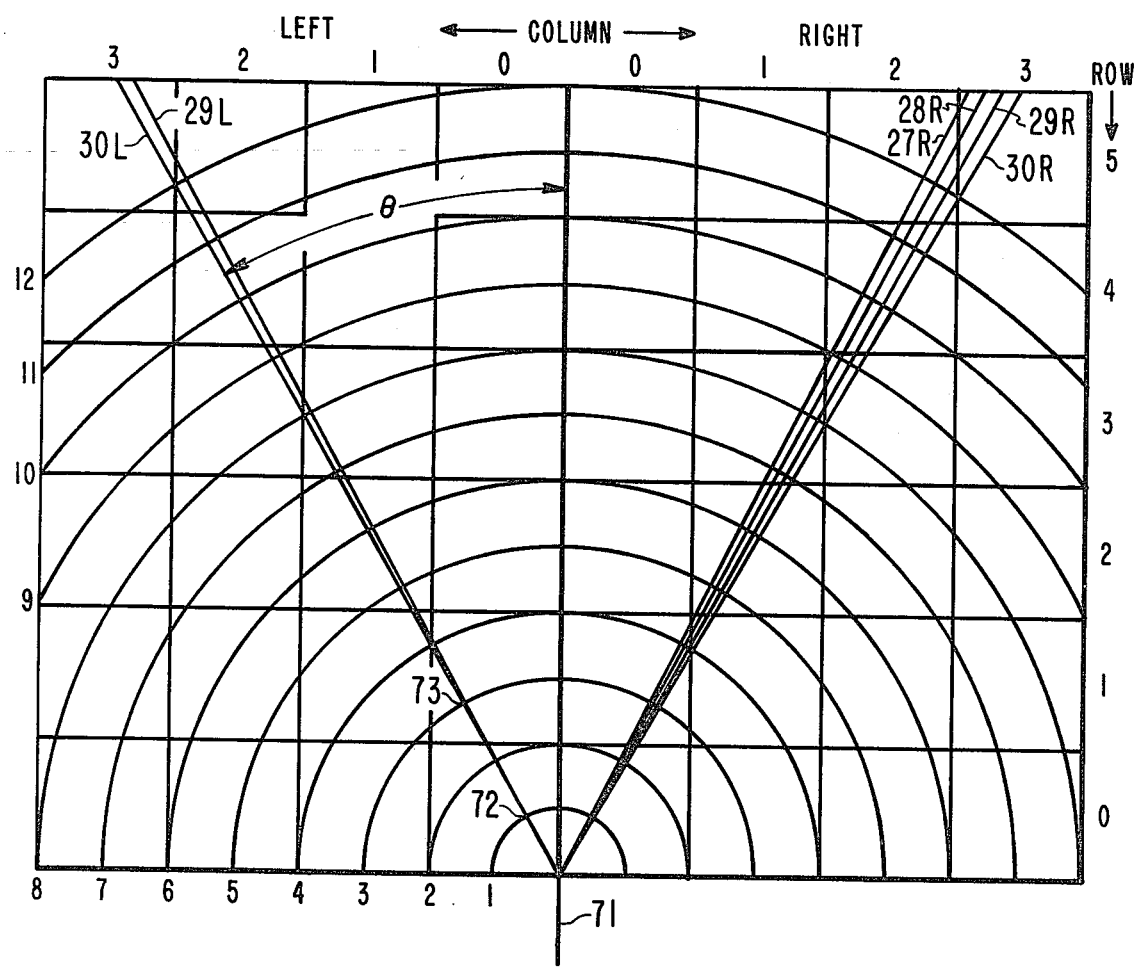
FIG. 2 is a rectangular coordinate grid pattern superimposed on a polar grid pattern.

This relationship will be best understood by referring to FIG. 2 where there is illustrated a rectangular matrix containing six rows numbered 0-5 and eight columns numbered 0-3 left and 0-3 right. Superimposed in this rectangular coordinate matrix are twelve circular arcs in polar coordinate form, numbered 1-12, intersected by a number of radial lines corresponding to the number of angles to which antenna 10 may be positioned. To avoid undue complexity in FIG. 2 only six such radial lines numbered 30L (left) (corresponding to an angle $\theta$ 30° left of center line 71), 29L, 27R (right) 28R, 29R and 30R are shown. In practice, the number would be much larger as would the number of circular arcs and the number of rows and columns. As has been mentioned, shift register 32, FIG. 1, will contain for a given angle, data for a given number $n$ of points along at that given angle. In FIG. 2, $n$ is 12 (or 13 if data is collected from a point immediately in front of the antenna). By virtue of the polar to rectangular coordinate converter 68 (FIG. 1) to be described in detail, data corresponding to the intersection of a given radial and circular line will be placed in memory at a location corresponding to the address of the rectangular coordinate location over which the intersection is superimposed. Thus, for example, the data corresponding to azimuth 30L, circular line 1 designated as point 72 will be placed in memory location column 0 left, row 0. The data corresponding to azimuth 30L circular line 3 will be placed in memory 40, in location column 0 left, row 1. This point is designated as 73.

By way of example, for azimuth 30 (i.e., for an angle of 30°) ROM 69 will contain the cosine value and sine value for 30 degrees scaled by the relationship of the number of circular lines and colocated squares, a 2:1 relationship as illustrated, as the distance between circles is half the distance between squares. Thus, for azimuth 30, ROM 69 contains a sine or horizontal value of 0.5000000 divided by 2 = 0.2500000 and a cosine or vertical value of 0.8660254 divided by 2 = 0.4330127. Such scaled sine and cosine values for all azimuths on one side of center line 10a (corresponding to center line 71, FIG. 2) to which antenna 10 may be positioned, will be previously stored in ROM 69 by any appropriate means. The portion of ROM 69 containing the Y or row values is coupled to a Y shift register 74 which forms part of a Y address generating circuit 75. Register 74 is capable of holding a binary number which is the equivalent of a fractional number to any desired number of decimal places. In one embodiment a storage capacity of 10 binary digits is provided in register 74.

Register 74 is connected in recirculating fashion via line 74a and to one input terminal of a summing means such as a full binary adder 78. A similar register 76 is connected to a second input terminal of adder 78. The Carry (C) output of adder 78 is coupled to the input of a carry flip flop 80 and to an overflow flip flop 82. Carry flip flop 80 is coupled to a third input terminal of adder 78. Adder 78 is of the type which will produce a logic 1 at its carry output terminal only if at least two of the three inputs to the adder are logic 1. Adder 78 produces a logic 1 at its output (O) terminal only if an odd number of inputs are at the logic 1 level and otherwise produces a logic 0 at the output terminal.

The output (O) terminal of adder 78 is coupled to the input of register 76 for purposes of transferring the sum of the contents of register 74 and 76 back into register 76.

The overflow terminal of flip flop 82 is coupled to a Y address counter 84. Overflow flip flop 82 produces a logic 1 to advance address counter 84 whenever the sum of the contents of registers 74 and 76 produce an overflow indicating a number of 1.0 or greater. The Y address counter 84 is coupled to terminal 64e of multiplexer 64 for providing the Y address values to memory 40 during write in. It will be noted that, during memory write in, pole 64c will be electrically connected to terminal 64e under control of read/write signal from TC 18.

An identical logic arrangement to that just described for generating Y address is also illustrated in FIG. 1 for generating X addresses. Similar elements are given legend numbers 100 greater than used for the Y value logic. Thus, for example, X shift register 174 corresponds to Y shift register 74.

The output of X address counter 184 is coupled to terminal 64f of multiplexer 64 for providing X addresses to memory 40 during writing. An UPDATE signal from TC 18 is coupled to the control terminals of registers 74, 76, 174, 176 for purposes of allowing the registers to read out when the UPDATE signal is at a logic 1. The UPDATE signal is also coupled to counters 84 and 184 for purposes of resetting the counters when UPDATE is at a logic 0. A LAST BIT line from TC 18 is coupled to overflow flip flops 82 and 182 and via a delay 88 to a control terminal of memory 40 and via a further delay 89 to OR gate 38. Timing pulse generator 18b in TC 18 under control of the READ/WRITE signal generated within TC 18 is coupled to registers 74, 76, 174, 176 for purposes of clocking data through the registers.

A description of the operation of FIG. 1 will be now given with the initial assumption that 1) antenna 10 is positioned to 30° left of center, 2) antenna position counter 66 contains a number corresponding to the 30° position (left and right values are identical in the example of FIG. 1) 3) read/write line from TC 18 is set to a binary value indicative of read out of memory 40, 4) poles 64c and 64d are positioned as illustrated in FIG. 1, and 5) a radar transmitting pulse has been emitted from antenna 10. When these assumptions exist, initially two events occur simultaneously. First, data is read out of memory 40 at a first rate for purposes of producing an image on display screen 46b. Second, radar return signals are being received at antenna 10 and stored in register 32 at a second much slower rate.

Memory 40 reads out digital information at terminal 40a from successive rows in the same column and then at successive columns all under control of TC 18 which issues Y and X (row and column) addresses to memory 40. The information signals which will typically be in binary form are converted to analog signals by DA 42. The analog signals represent particular levels of brightness to be displayed on different areas on screen 46b. The brightness levels on screen 46b may range from a dark screen to full brightness screen depending on the binary values of signals appearing at screen modulation terminal 46a. TC 18 which controls the addressing for readout of memory 40 also controls the location on screen 46b of the intensity modulated signals applied at terminal 46a by means of controlling sweep circuits 50 which typically cause a series of vertical sweep lines to appear on screen 46b. These sweep lines may be interlaced as in a standard television fashion or not as desired. In this manner screen 46b is continually refreshed from memory 40.

While screen 46b is being refreshed, a radar return signal is being received at antenna 10 which, as a function of time, represents atmospheric conditions at increasing distances from the antenna at an angle of 30° left from center line 10a. The return signal is amplified and shaped by RT 12, then digitized by AD 14 into, for example, parallel two bit signals which in combination continually represent the analog signal received at antenna 10. VO 18a, under control of the maximum range switch 36 which determines the period of VO 18a and under control of the R/T trigger on line 24 which references range origin, produces periodic momentary pulses which are applied to the clock (C) terminal of shift register 32 to clock two bit signals into and through the register until the register is full.

Each of the two bit signals in shift register 32 will be hereinafter designated a data cell. In one typical radar system register 32 has a capacity for 256 data cells. For the arrangement illustrated in FIG. 2, however, register 32 has a capacity for 12 data cells. Therefore, after VO 18a has produced twelve pulses to load twelve data cells representing meteorological conditions at twelve spaced points, the contents are available to be transferred to memory 40.

It will be recalled that the period of the clock pulses from VO 18a is determined by the setting of maximum range switch 36 which setting is determined by the maximum range of interest to the operator. The speed of loading register 32 relative to the refresh rate of screen 46b is such that the screen will be refreshed several times while the register is being loaded. When the register is loaded and while thereafter a retrace back to the beginning of the scan on screen 46b is occurring, the read/write line in TC 18 produces a signal which causes memory 40 to be conditioned for receiving information from shift register 32 and causes poles 64c and 64d of multiplexer 64 to shift to terminals 64e and 64f to thus receive address information from converter 70.

While shift register 32 was being loaded, antenna position counter 66 addressed the portion of read only memory 69 containing scaled sine and cosine values for the angle at which antenna 10 is positioned i.e., 30°. Therefore, when memory 40 is conditioned for writing, a logic 1 pulse on Load Register line 70 (see FIG. 3) conditions ROM 69 for readout. Concurrently, timing pulse generator 18b is conditioned by TC 18 to produce a number of pulses (FIG. 3, legend 90) to load the Y register 74 and X register 174 with cosine and sine information respectively. With the assumed ten digit accuracy, timing pulse generator 18b produces ten pulses to load the Y and X registers 74 and 174. See FIG. 4 (the row denoted INITIAL) for the contents of several registers after the initialization process is complete. After Y register 74 and X register 174 have been loaded from ROM 69, TC 18 produces a logic 1 UPDATE signal which conditions registers 74 and 174 to recirculate their contents to retain sine and cosine values from ROM 69, and simultaneously conditions registers 76 and 176 to load a bit at a time, respectively, summing means 78 and 178. It should be noted that prior to becoming a logic 1, the UPDATE signals was a logic 0 which cleared address counters 84 and 184 to a count of 0.

TC 18 then conditions timing pulse generator 18b to produce a series of 10 pulses (legended 91 in FIG. 3) which cause the contents of Y register 74 and the sum of Y register 76 to be transferred a bit at a time to, and be added by a summing means 78. The contents of Y register 74 are concurrently recirculated via line 74a back into Y register 74 while the summation produced by summing means 78 is shifted into sum of Y register 76. Since initially the sum of Y register 76 contains zero (see FIG. 4, INITIAL row) after the summing occurs the contents of the sum of Y register 76 will be equal to the contents of the Y register 74. See FIG. 4, data cell 1 row. During the time the last or most significant bit in register 74 (left most bit in FIG. 4) and the last bit in register 76 are being summed in summing means 78, TC 18 produces a LAST BIT pulse (see FIG. 3, pulse 92) which primes overflow flip flop 82 to receive a logic 1 pulse if any, indicative of overflow from the addition of the last bit in registers 74 and 76. For the first addition now being described there is no overflow. Therefore, after the addition, flip flop 82 will not be set and Y address counter 84 will continue to remain at a count of 0. A similar addition concurrently occurs in X register 174 and sum of X register 176 so that at the conclusion of the addition X address counter 184 will also be at a count of 0.

Since the contents of the counters 84 and 184 provide the row and column address for memory 40, row 0 column 0 will be addressed. Additionally the line from TC 18 labeled left/right coupled between TC 18b and memory 40 will determine whether the left half of the memory, corresponding to the left half scan or the right half of the memory corresponding to the right half scan is addressed. In the example being described the left half is addressed. After a delay in delay 88 sufficient to allow counters 84 and 184 to increment, the LAST BIT signal is applied to the memory 40 to write the least significant data cell into memory 40 address determined by the counts in counters 84 and 184. After further delay in delay 89 LAST BIT is applied to the (C) terminal of shift register 32 to shift the contents one position.

After one cell of data has written into memory 40 a second group 93 of timing pulse generator 18b pulses (see FIG. 3) causes the contents of Y register 74 and the sum of Y register 76 to be again added and placed into the sum of Y register 76. When the contents of a specific bit location in both the Y register 74 and sum of the Y register 76 applied to summing means 78 are a logic 1 a carry out pulse at the (C) terminal of summing means 78 will be generated which will set the carry flip flop 80. When the carry flip flop 80 is set and the next pair of bits are added a 1 will be added because of the carry flip flop. When the second addition is complete, as there is no carry out upon the addition of the most significant bit of the Y register 74 and the sum of the Y register 76 or X register 174 and sum of the X register 176, the X and Y address counters will still remain 0. Therefore, after the second last bit pulse 94 is produced by TC 18 (see FIG. 3) and delayed by delay 88, the second data cell in register 32 will also be written into memory 40 X and Y location 0, thus overriding what was written in previously.

Following the second set of pulses 93, a third identical set (not shown) again causes the addition of the sum of the Y register 76 and Y register 74. This time, however, as there is a carry out at the C terminal of summing means 78 upon the addition of the most significant bit a 1 will be added to counter 84. No carry out occurs in the most significant bit of the X register. Thus the third data cell will be written into memory 40 address Y=1, X=0.

Figures 3, 4:
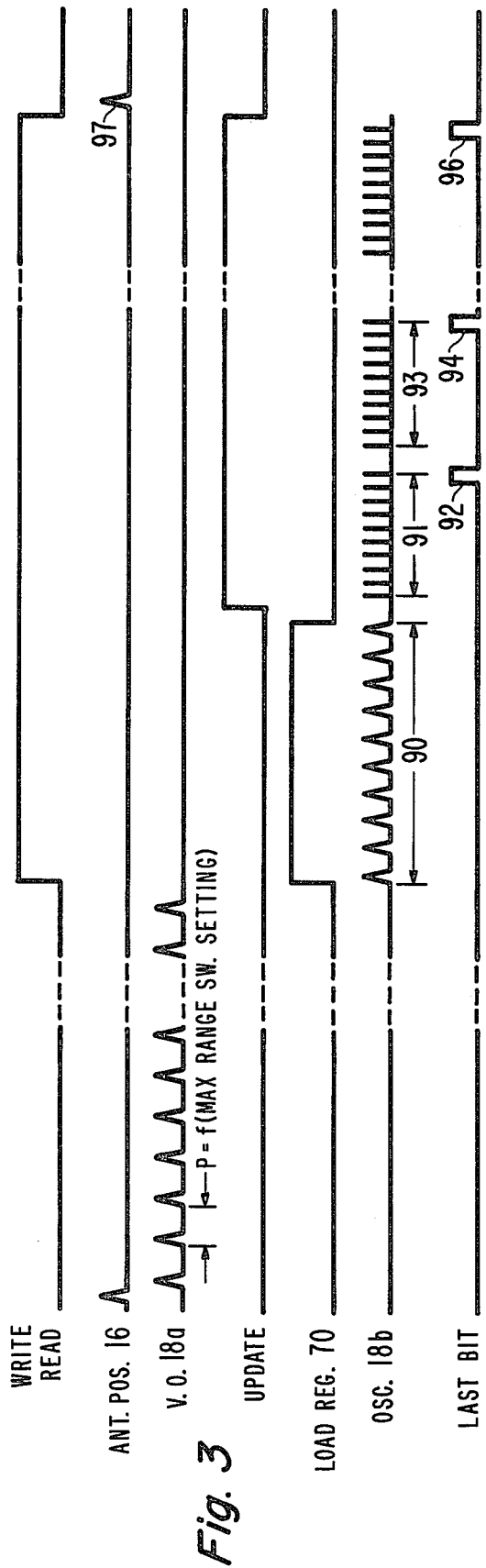
FIG. 3 is a set of signal waveforms useful in understanding the operation of the system of FIG. 1.
FIG. 4 is a table listing the contents of various registers and counters of the system of FIG. 1 at various points in time.

In the above described manner, after the twelfth addition, the Y counter will be set to the value 5 while the X counter will be set to the value 3 (see FIG. 4). Thus the twelfth or last data cell will be clocked out of shift register 32 by the LAST BIT pulse 96 (FIG. 3) and written into Y location 5 and X location 3 in memory 40.

After the last data cell has been written into memory 40 the read/write line again goes to logic 0 returning multiplexer 64 to the condition illustrated in FIG. 1, i.e., with poles 64c and 64d coupled to terminal 64a and 64b respectively. The timing of the system of FIG. 1 is such that the transfer of data from shift register 32 into memory 40 takes place during the time of retrace on screen 46b. The rate of occurrance of the LAST BIT signals which transfer data from register 32 to memory 40 is typically much greater than the rate of transfer of data into register 32 but somewhat slower than the rate of data out flow from memory 40. When the transfer is complete refresh of screen 46b continues.

Meanwhile antenna position pulse 97 is issued by TC 18 to step antenna 10 to a new antenna position, step counter 66 to track the position of antenna 10 and thereafter the operation just described repeats for a succeeding azimuth line. It will be understood that when the next succeeding azimuth line is written into memory 40 many of the locations in memory previously written into during the writing of line 30 left will be overwritten with the new succeeding data.

If antenna 10 fails to step to a new azimuth position as a result of pulse 97, shift register 32 will be filled with the same data with which it was filled in the sequence just described. This condition will be displayed on display screen 46b as two adjacent azimuth lines with the same data content and is probably not detectable under ordinary conditions. However, if the antenna continues to stick, display screen 46b will begin to display successive semicircular arcs with different distances being at different brightnesses depending on the atmospheric conditions directly in front of the antenna which can easily be observed by an operator as a manifestation of a stuck antenna. This display condition is used as a warning to an operator to take appropriate action.

It will be understood that FIG. 1 represents only one embodiment of the invention where there is available a relatively long time to determine addresses in the polar to rectangular coordinate converter. If less time is available the circuit can be altered to provide for loading the Y register 74 and X register 174 while shift register 32 is receiving information. Further, the information can be loaded to the sum of the Y register 76 and sum of the X register 176 while being loaded into the Y register 74 and X register 174 thus eliminating the need for the first addition.

Although the described system is concerned with an antenna that pivots less than 90° each side of a center line the principle of summing to obtain memory addresses is effective for a system which operates over any number of degrees including a full circle. In most practical systems scaled sine and cosine values for only 90° need be stored.

It has been mentioned earlier that the sine and cosine values of each azimuth position are scaled before entry into ROM 69. Alternately, it should be realized that the scaling could be accomplished by scaling the outputs of counters 84 and 184. For example, in an exemplary description the sine and cosine values of 30° could be entered into ROM 69 then the counts in counters 84 and 184 could be divided by two by merely ignoring the least significant output position of each of the counters.

For purposes of the claims appended hereto, however, the sine and cosine values are intended to encompass both scaled and non scaled values.

What is claimed is:

1. A polar to rectangular coordinate converter which produces, for azimuth values and range values in a polar coordinate system, corresponding row and column values in a rectangular coordinate matrix comprising in combination:

means receptive of a signal indicative of a desired one of said azimuth values for producing fractional trigonometric sine and cosine values corresponding thereto;

first and second storage means;

first summing means receptive of said sine value and the value in said first storage means for computing the sum thereof and for storing the fractional part of said sum in said first storage means and for producing a pulse indicative of the integer part, if any, of said sum and for repeating said sum computing operation with said sum and said sine value a number of times corresponding to the number of ranges of interest for said desired azimuth;

first counter means responsive to said integer indicative pulses for counting the same, the count in said counter at the completion of each sum computing operation representing the value of one of said row and column;

second summing means receptive of said cosine value and value in said second storage means for computing the sum thereof and for storing the fractional part of said sum in said second storage means and for producing a pulse indicative of the integer part, if any, of said sum and for repeating said sum computing operation with said sum and said cosine value a number of times corresponding to the number of ranges of interest for said desired azimuth; and second counter means responsive to said integer indicative pulses from said second summing means for counting the same, the count in said counter at the completion of each sum computing operation representing the value of the other of said row and said column.

2. The combination as set forth in claim 1 wherein said means for producing trigonometric values comprises a read only memory storing said sine and cosine values in digital form for each azimuth value of interest.

3. The combination as set forth in claim 2 wherein said first and second storage means comprise respectively first and second shift registers for storing said sums and third and fourth storage means receptive of said sine and cosine values from said read only memory for storing the same and coupled to said summing means for providing sine and cosine values thereto.

4. The combination as set forth in claim 1 further including a random access memory arranged in addressable rows and columns and wherein said first and second counting means are coupled to said memory for addressing the same.

5. The combination as set forth in claim 4 wherein the source of data stored in said memory is a weather radar system which includes a pivotable antenna and which produces signals to be stored in said memory as a function of the azimuth of said antenna and range of signals produced thereat.

6. The combination as set forth in claim 5 further including display means having addressable display points thereon coupled to said memory for receiving signals seriatum therefrom corresponding to data stored therein for display at successive ones of said points thereon and further including means coupled to said display means for controlling whereon signals from said memory are displayed.

7. The combination as set forth in claim 5 further including a buffer means coupled between said radar system and said memory and further including first clock means coupled to said buffer for controlling the rate of write in to said buffer of signals from said radar system and further including second clock means operating at a different rate than said first clock means for reading signals out of said buffer to said memory.

8. The combination as set forth in claim 5 wherein said weather radar includes means providing command signals and wherein said pivotable antenna is responsive to each of said command signals it receives for pivoting to a successive angular position and further including a third counter means responsive to each of said command signals for producing said signal indicative of a desired one of said azimuth values corresponding to the azimuth of said antenna.

9. The combination as set forth in claim 5 wherein said weather radar includes means providing command signals and wherein said pivotable antenna is normally responsive to each of said command signals it receives for pivoting to a successive angular position, said antenna being subject to failure by not advancing from one position upon receipt of at least one of said command signals and further including a third counter means responsive to each of said command signals for producing said signal indicative of a desired one of said azimuth values corresponding to the azimuth of said antenna and, upon said antenna failure, continuing to count upon receipt of each of said command signals for causing memory rectangular coordinate addresses for successive azimuths to be generated and causing data from said antenna at said one position to be written into addresses generated for successive azimuth positions in memory.

10. The combination as set forth in claim 9 further including display means coupled to said memory to display the contents thereof and responsive to signals from said memory upon said failure of said antenna to display a pattern indicative to an operator of antenna failure.

* * * * *